Figure 12:
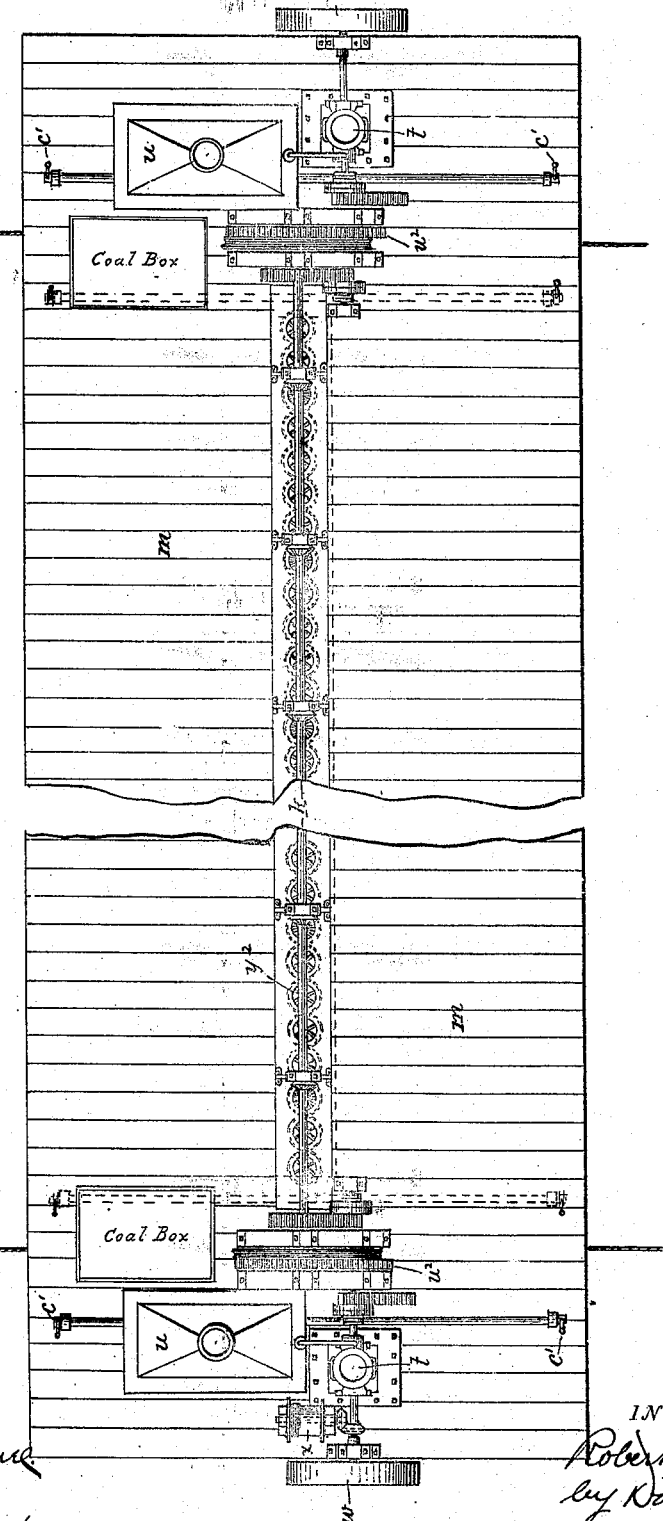

(No Model.) 12 Sheets—Sheet 1.
R. ROMAINE.
SYSTEM AND APPARATUS FOR FARM CULTIVATION AND HARVESTING.
No. 292,511. Patented Jan. 29, 1884.
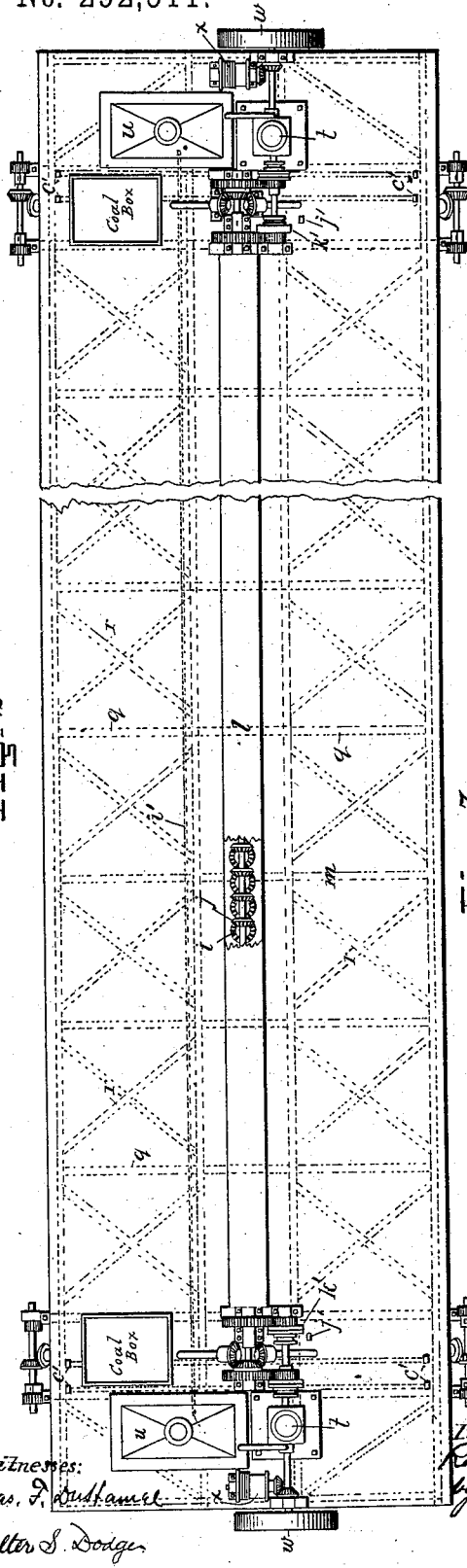
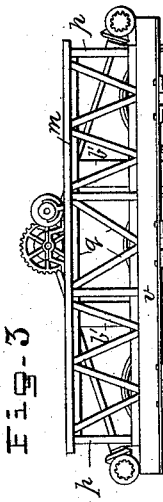
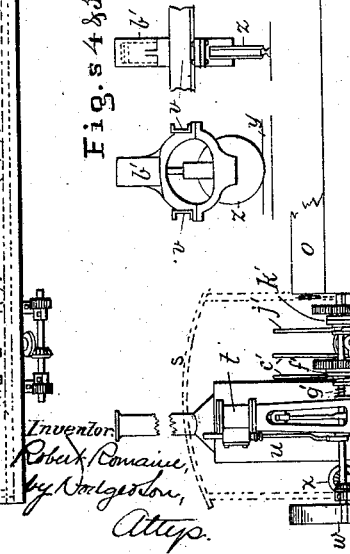
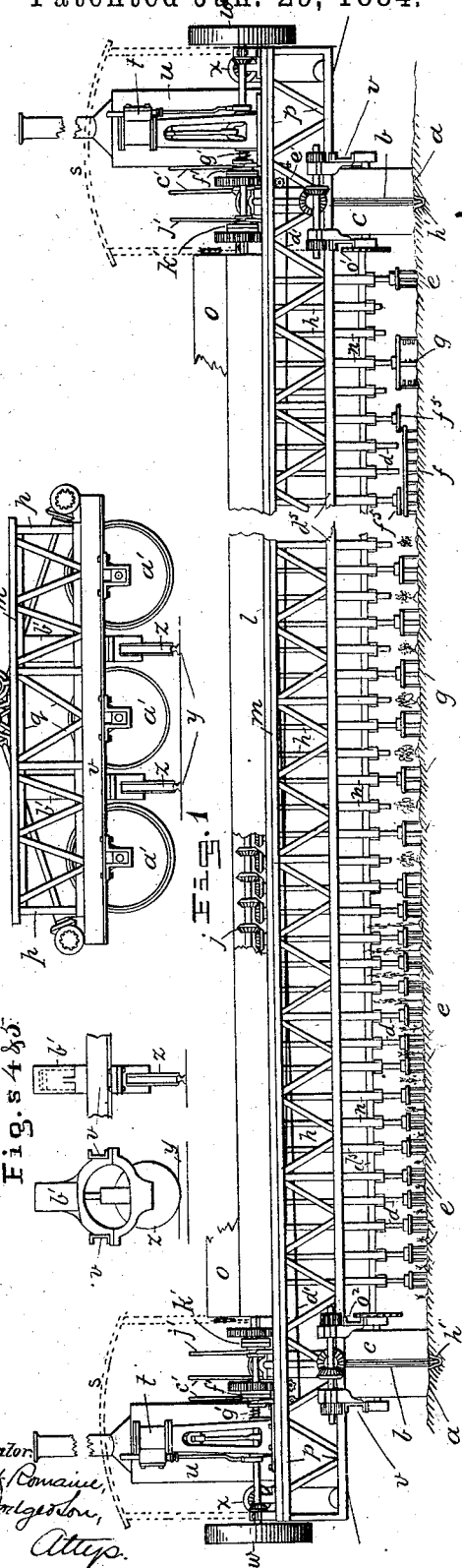

(No Model.) 12 Sheets—Sheet 2.
R. ROMAINE.
SYSTEM AND APPARATUS FOR FARM CULTIVATION AND HARVESTING.
No. 292,511. Patented Jan. 29, 1884.
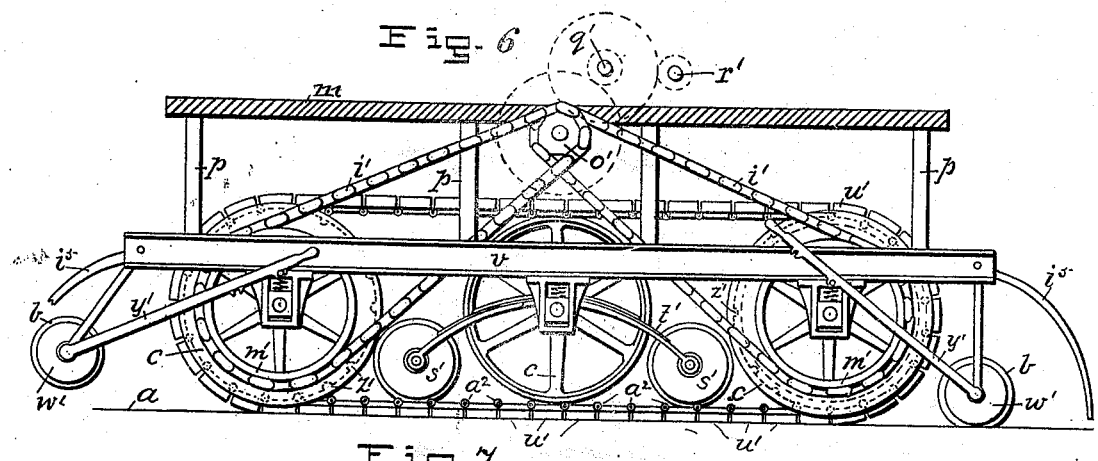
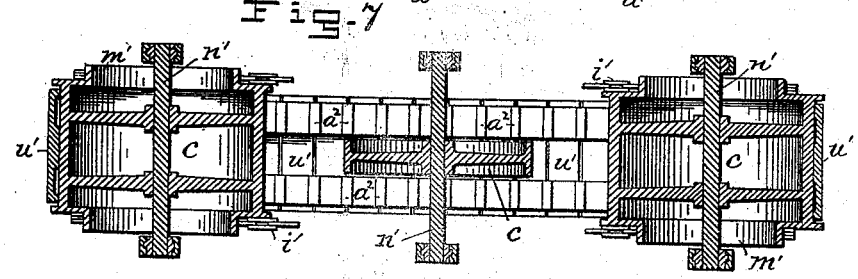
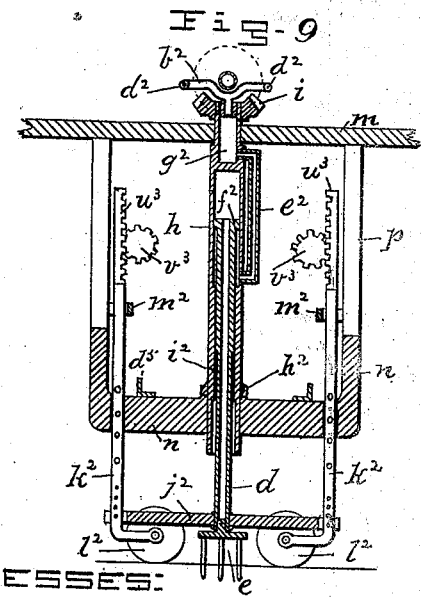
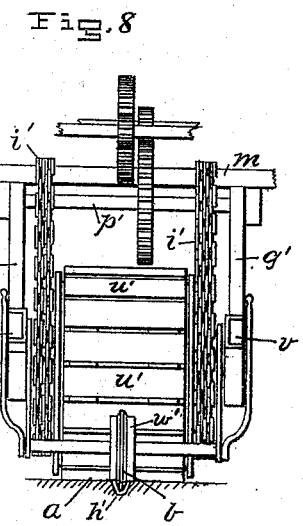
WITNESSES:
Jas. F. Duhamel
Walter S. Dodge
INVENTOR:
Robert Romaine,
by Dodge & Son,
Attys

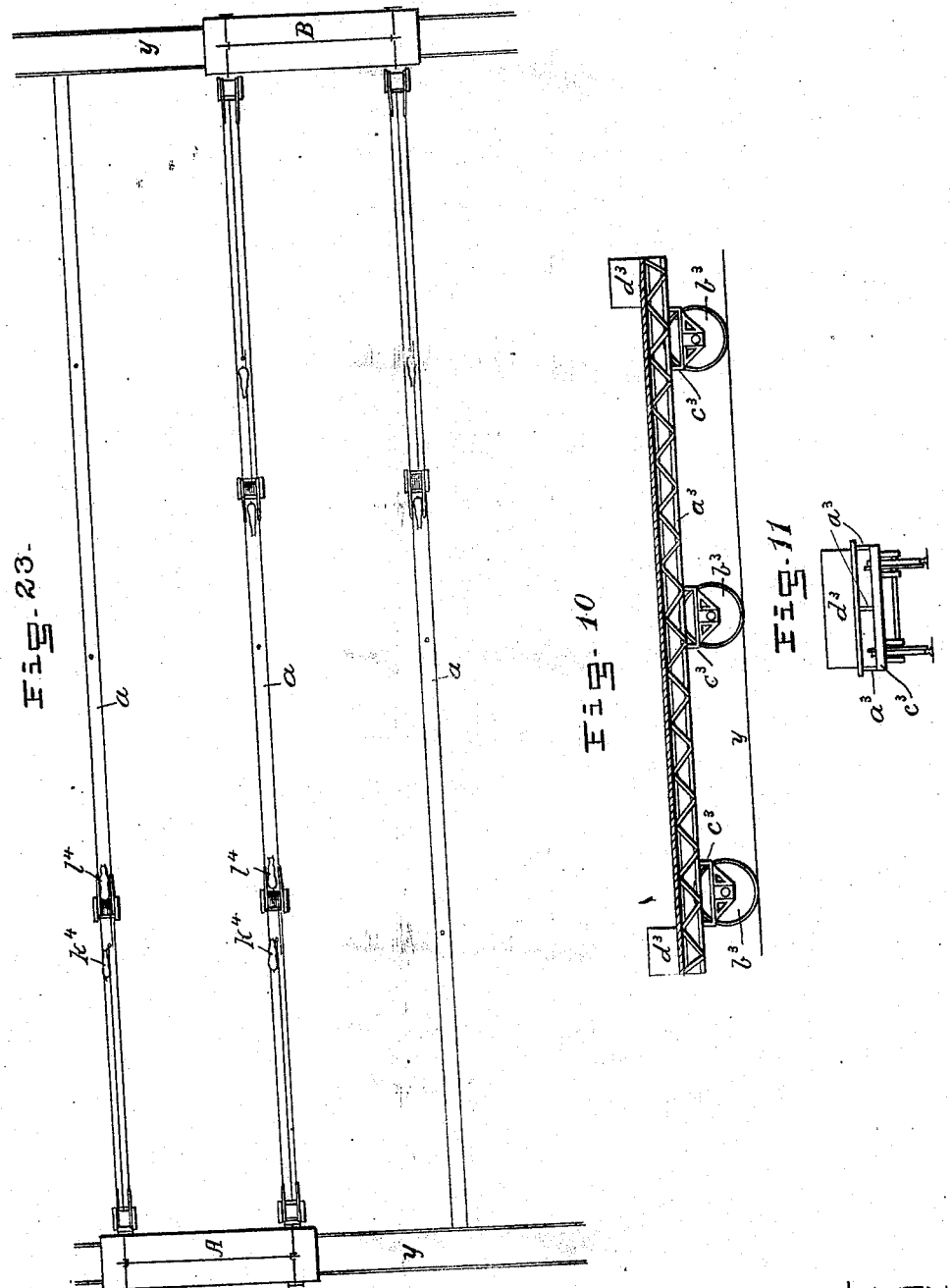

(No Model.) 12 Sheets—Sheet 4.

R. ROMAINE.
SYSTEM AND APPARATUS FOR FARM CULTIVATION AND HARVESTING.

No. 292,511. Patented Jan. 29, 1884.

WITNESSES
Jas. F. DuHamel
Walter S. Dodge.

INVENTOR:
Robert Romaine,
by Dodge & Son,
Attorneys.

(No Model.) 12 Sheets—Sheet 5.
R. ROMAINE.
SYSTEM AND APPARATUS FOR FARM CULTIVATION AND HARVESTING.
No. 292,511. Patented Jan. 29, 1884.
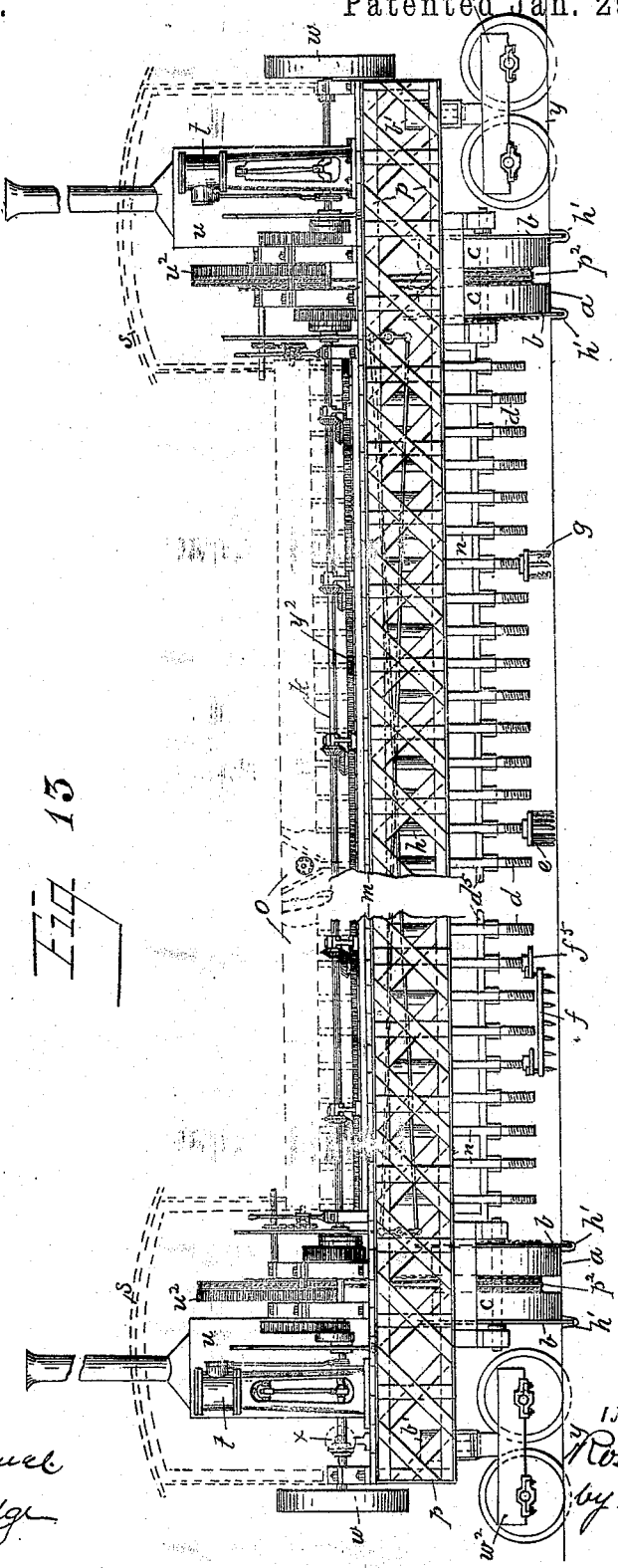

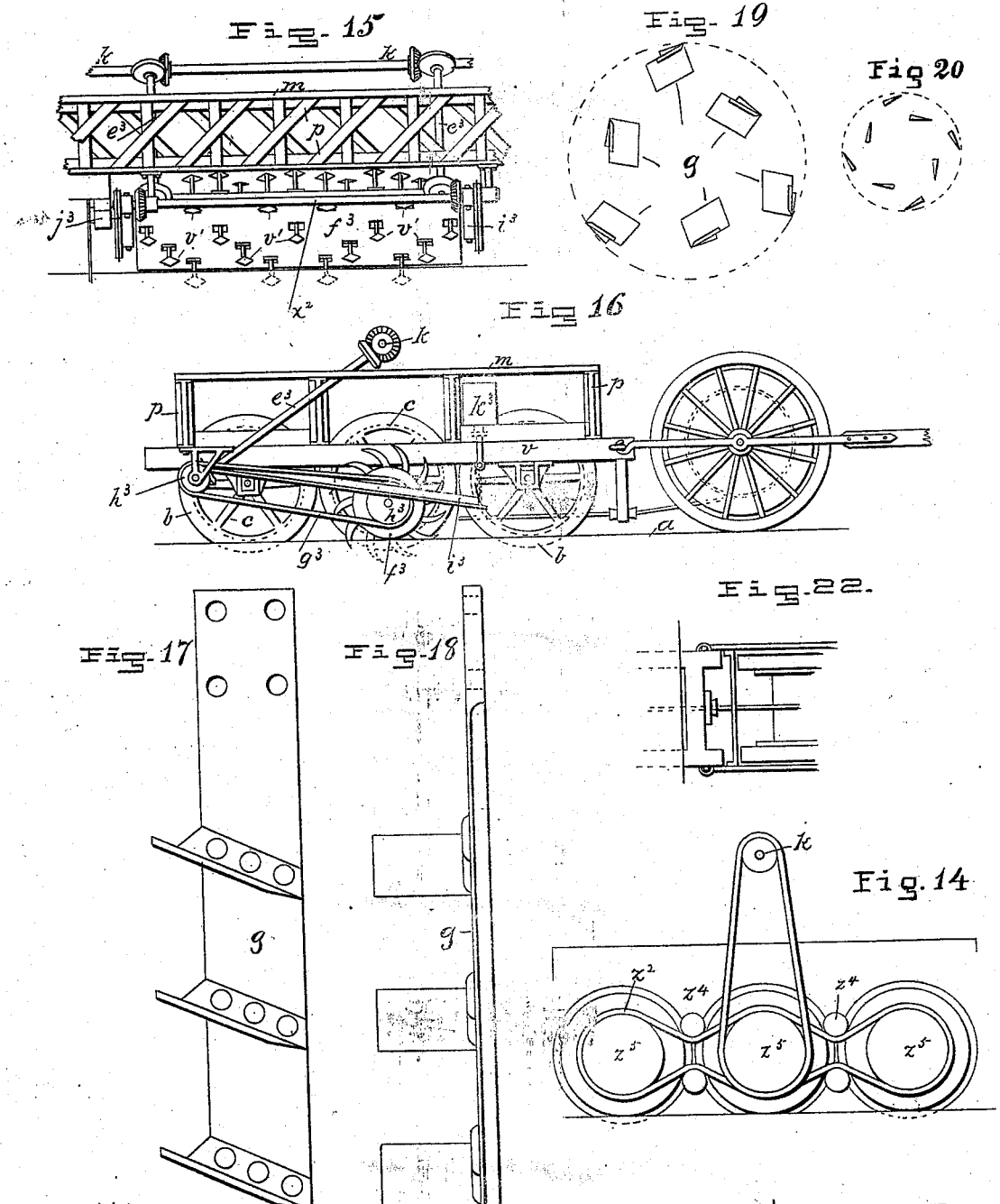

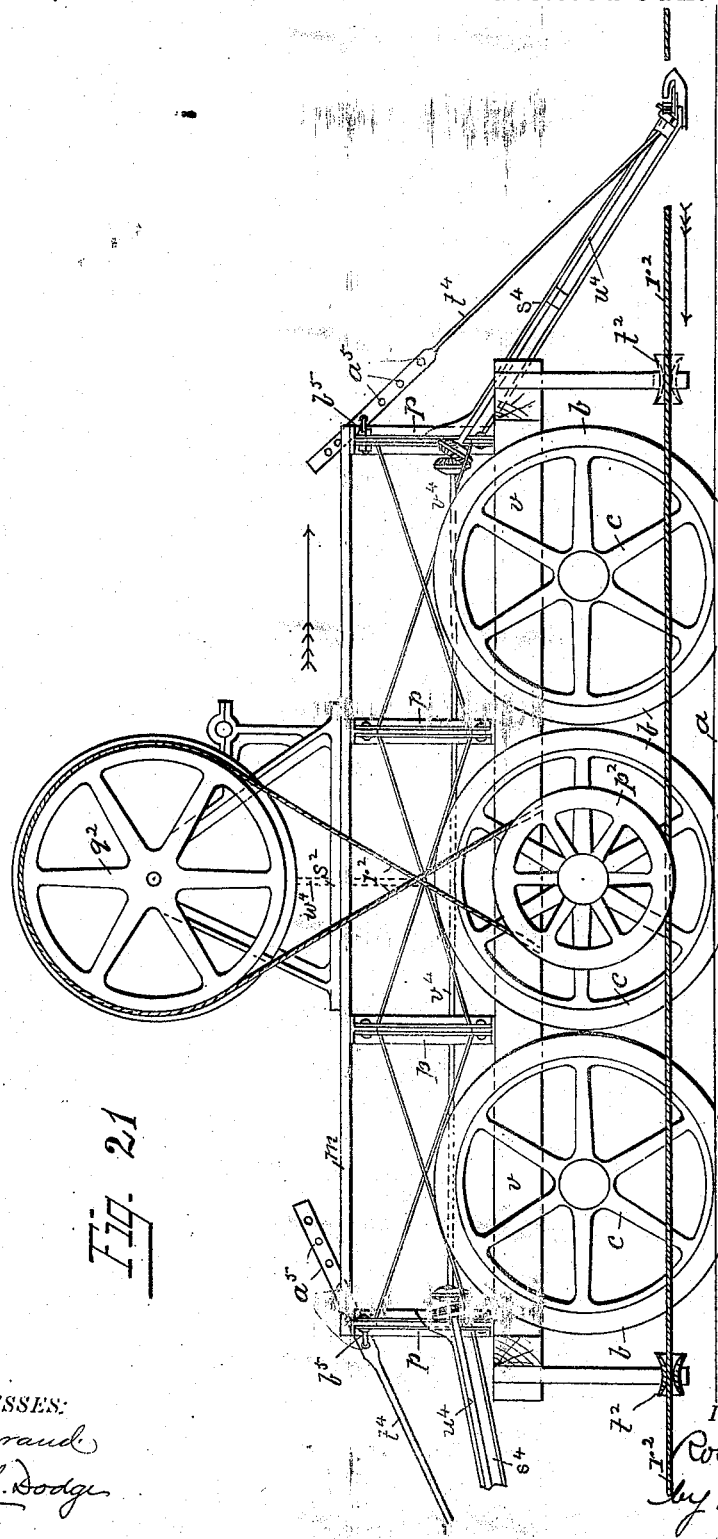

(No Model.) 12 Sheets—Sheet 8.
R. ROMAINE.
SYSTEM AND APPARATUS FOR FARM CULTIVATION AND HARVESTING.
No. 292,511. Patented Jan. 29, 1884.
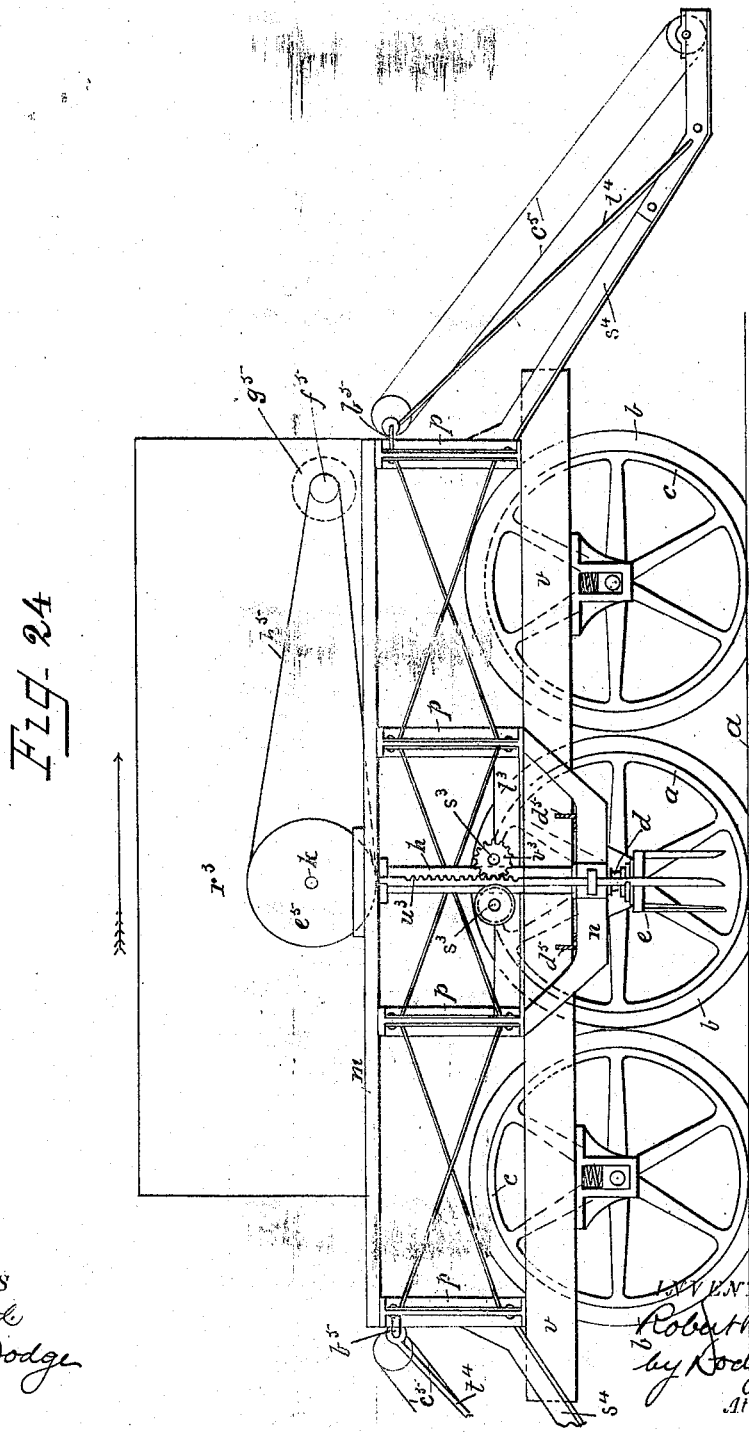

(No Model.) 12 Sheets—Sheet 9.
R. ROMAINE.
SYSTEM AND APPARATUS FOR FARM CULTIVATION AND HARVESTING.
No. 292,511. Patented Jan. 29, 1884.
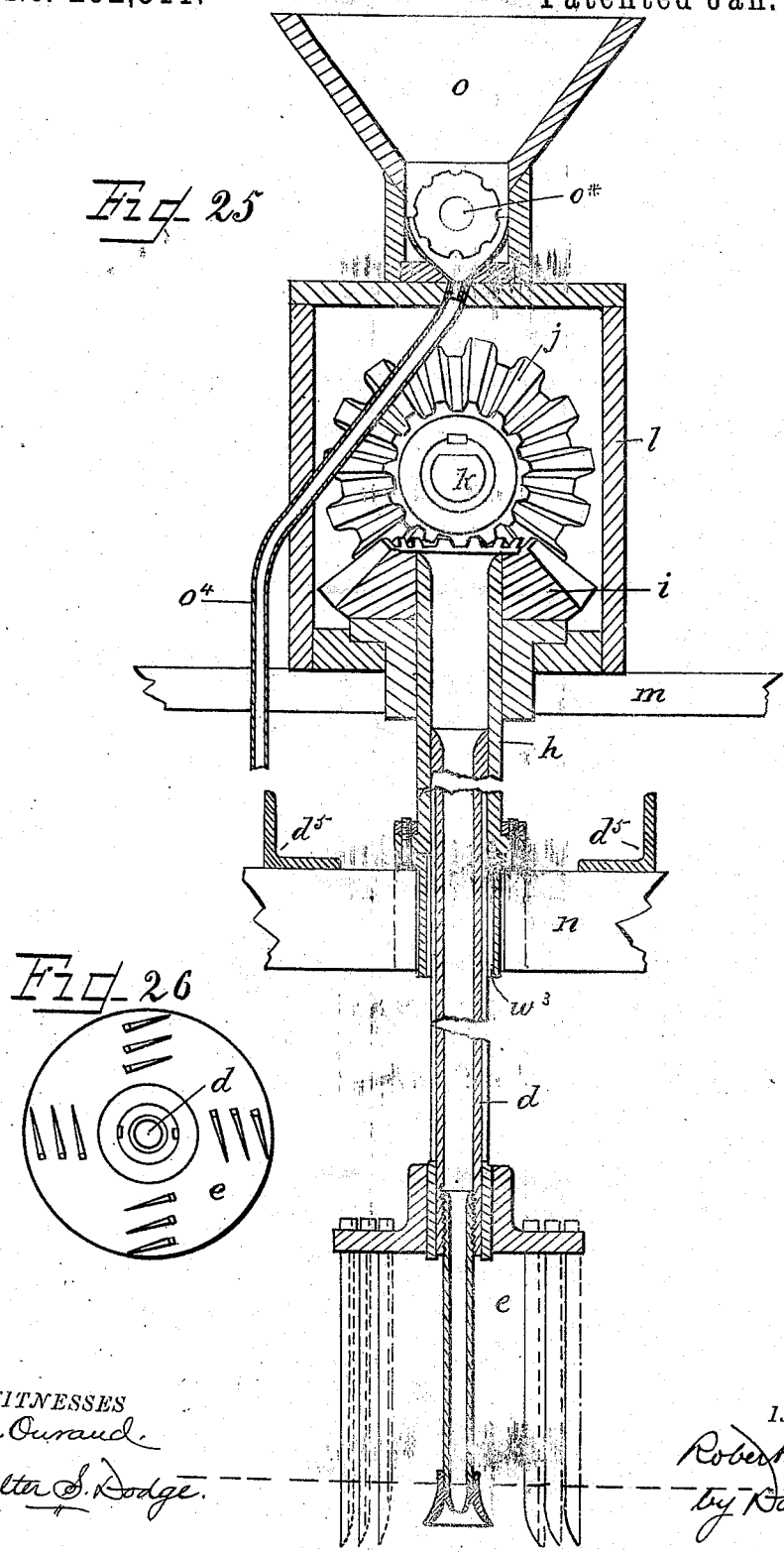

(No Model.)  12 Sheets—Sheet 10.
R. ROMAINE.
SYSTEM AND APPARATUS FOR FARM CULTIVATION AND HARVESTING.
No. 292,511. Patented Jan. 29, 1884.
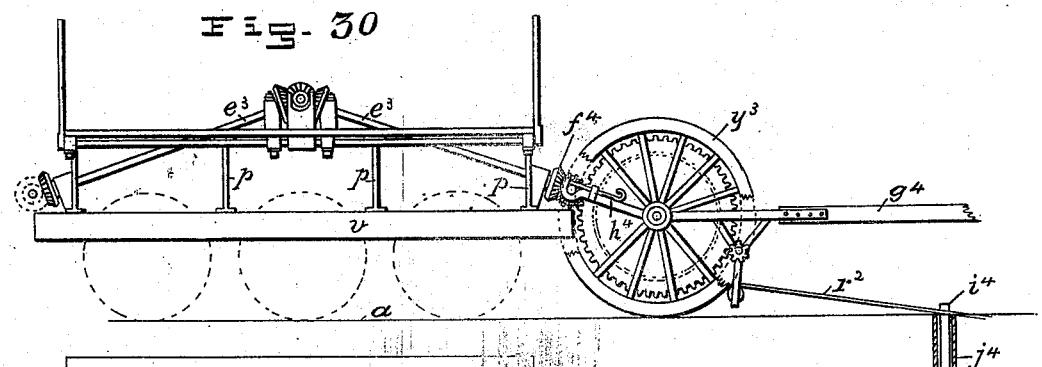
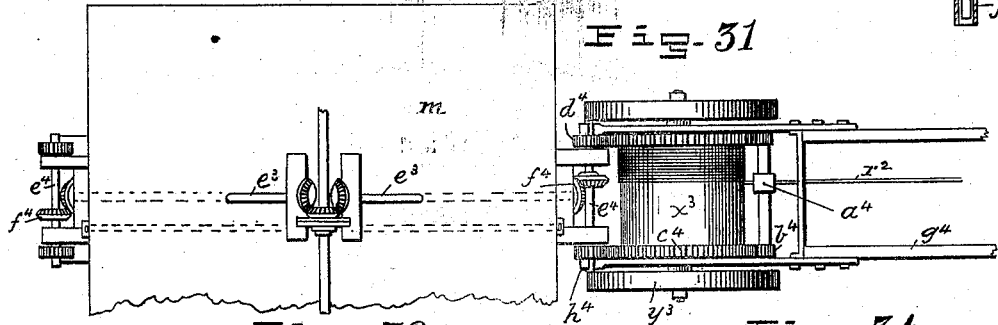
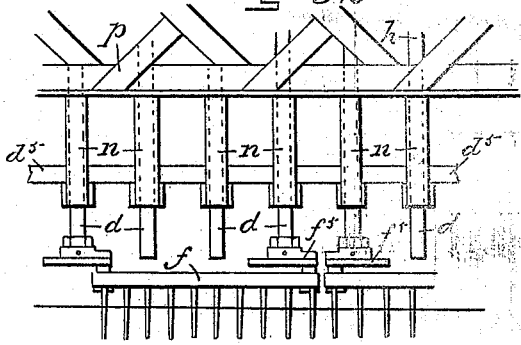
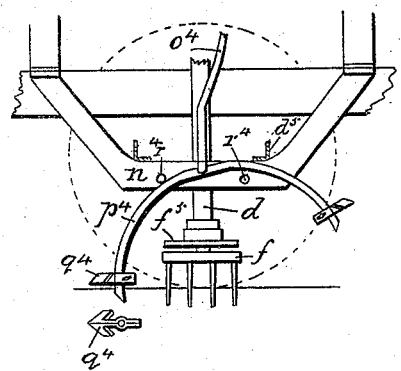
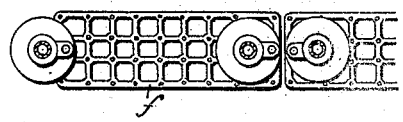
WITNESSES:
Jas. F. Duhamel
Walter S. Dodge
INVENTOR:
Robert Romaine,
by Dodgeston,
Attys.

(No Model.)
12 Sheets—Sheet 11.

R. ROMAINE.
SYSTEM AND APPARATUS FOR FARM CULTIVATION AND HARVESTING.

No. 292,511.
Patented Jan. 29, 1884.

Witnesses:
Jas. F. DuHamel
Walter S. Dodge

Inventor:
Robert Romaine,
by Dodge&Son,
Attys.

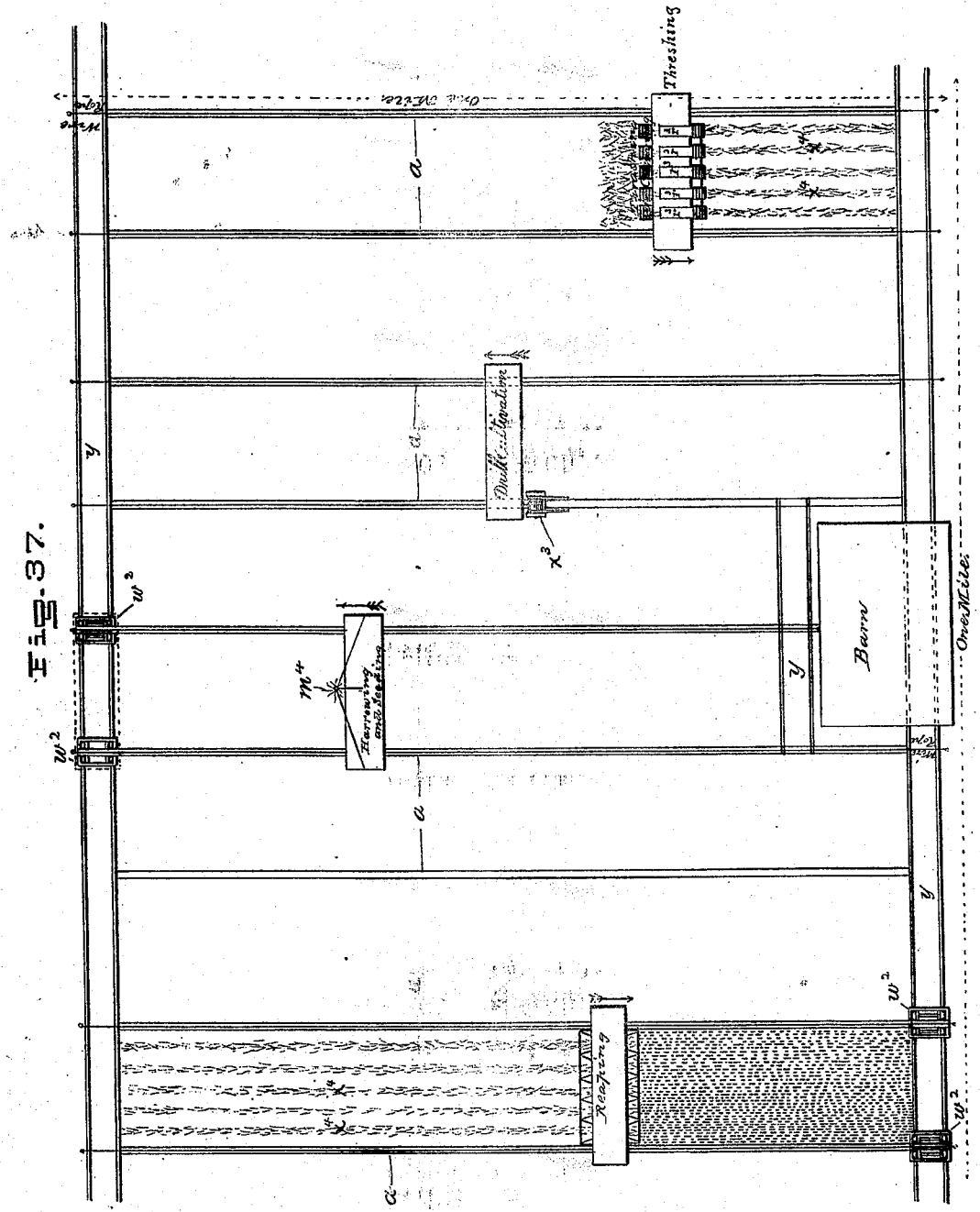

UNITED STATES PATENT OFFICE.

ROBERT ROMAINE, OF OTTAWA, ONTARIO, CANADA.

SYSTEM AND APPARATUS FOR FARM CULTIVATION AND HARVESTING.

SPECIFICATION forming part of Letters Patent No. 292,511, dated January 29, 1884.

Application filed November 6, 1882. (No model.)

*To all whom it may concern:*

Be it known that I, ROBERT ROMAINE, of Ottawa, in the county of Carleton, Province of Ontario, Canada, have invented certain Improvements in Systems of and Apparatus for Farm Cultivation and Harvesting, of which the following is a specification.

The nature of the invention will be more fully ascertained from the following statement:

I. To place in the hands of farmers, gardeners, and others who require it, a powerful steam self-propelling locomotive machine and apparatus, supported and propelled at each end by means of an endless railway (more particularly described hereinafter) encircling and traveling round in conjunction with two or more broad wheels or rollers, which machinery and apparatus are suspended high enough above the ground to permit them to pass and travel over the growing crops until they have attained a height of four feet, more or less, without injuring them, in order to cultivate, hoe, earth up, and repeatedly stir the soil between the drilled rows of grain or root crops. This machine is, by preference, made of four steel lattice-girders, suitably braced transversely and covered with a strong and creosoted plank flooring, appearing like and forming a species of portable or locomotive bridge, which may be made of different lengths to suit circumstances, but at present intended and shown on the drawings to be about sixty-six feet long by fifteen feet broad, cultivating and harvesting a strip of land about fifty feet wide, leaving both ends of the locomotive-bridge overhanging about eight feet from the inside of the two endless railways and bearing-wheels, on which ends are carried the requisite motive power, coal-bunks, water-tanks, &c., all properly housed and sheltered from dust, dirt, the weather, and from the liability, while working, of setting fire to the grain crops, buildings, &c., also employing as an auxiliary, when necessary and where the surface of the land is very hilly, uneven, or swampy, winding-drums with wire ropes, mounted on large cart-wheels or grooved pulleys or sheaves, one set at each end to haul the locomotive-bridge forward and backward, and to aid in the locomotion over the land at different rates of speed to suit the work on hand, and capable, when required, by means of the electric or other similar artificial light, to do its work in the night-time almost as well as in the day-time. Where the boundaries of a farm are irregular and the lay of the land, from the existence of deep ravines and gulleys or otherwise, will not permit of its being divided into exact strips of fifty feet wide or thereabout, I would shorten the length of the locomotive-bridge to suit such a farm; or, if necessary or desirable, the length of the locomotive-bridge may be greatly increased (so as to take and cover much wider strips of land without adding much to the first cost of the whole machinery and apparatus) by merely placing a third set of three bearing-wheels in a line under the center of the locomotive-bridge, traveling on the bare ground between two rows of the drilled grain or other crops, so arranged with strong springs or by hydraulic pressure as to support and relieve the locomotive-bridge of a sufficient portion of its weight, but not enough in any case to injure or affect the proper steering qualities of the endless railway at each end, the effect of increasing the length of the locomotive-bridge being more a question of consuming more fuel and doing more work in a given time than the expense incurred in lengthening the locomotive-bridge.

II. As far as possible, by means of machinery and suitable apparatus, driven by suitable motive power, to effectually substitute for the old-fashioned plows, cultivators, clod-crushers, rollers, harrows, seeders, and similar traction implements—involving the work of five or six expensive operations before producing a completed seed-bed—a series of quick rotating and reciprocating implements, suspended over the whole width of the strip of land to be cultivated and spanned by the locomotive-bridge, both vertically and horizontally, capable of self-adjustment as to the depth the rotating implements have to penetrate beneath the uneven surface of the land, in order to produce a more thorough and accurate pulverization and aeration of the soil; and, also, by means of a series of partly-flexible tubes suspended under the locomotive-bridge in a line between and sometimes directly behind the rotating implements, connected with a seed-sower, placed on the locomotive-bridge and immediately over the rotating implements, to sow the seed the required width and depth, the whole apparatus being propelled with a slow progressive movement, producing a seed-bed fifty feet wide, more or less, and any length that the circumstances may dictate, provided the length is not too short, so as to avoid the too frequent transfers of the locomotive-bridge from one strip of land to another, and consequent loss of time, (hereinafter referred to and shown on the drawings.)

III. In so arranging and attaching in a vertical and horizontal position to a self-propelling motive power apparatus a series of rotating and reciprocating cutting and digging implements, whereby the soil between the rows of growing crops, whether grain, corn, root, or fruit crops, or crops of cotton, tea, or other tropical plants, can be effectually and repeatedly stirred, hoed, or earthed up from the time the plants are two or three inches above the ground until they have attained the height of three or four feet, thereby encouraging and facilitating a more rapid growth, drying up and raising the temperature of cold wet soils, especially in spring time, and in a long season of drought supplying moisture to the plants from the subsoil, through the instrumentality of capillary attraction, to the great benefit of the growing crops, and whereby, also, in the case of summer fallowing or autumn-work, stubble, grass sod, or a green crop for the purpose of green-manuring, may be dug up and buried beneath the surface, bringing the virgin subsoil to the surface to be made friable when acted upon by the autumn rains, frost, and atmosphere.

IV. In order to secure the most accurate travel and steering of the locomotive-bridge, so that the dropping of the seed in a straight line from the seed-drills, and then the rotating and working of the several implements between the rows of grain, &c., may be effectually attained, I lay out the farm or block of land to be cultivated in parallel strips of the proper width to suit the distance or span between the endless railway and bearing-wheels of the locomotive-bridge, forming parallel paths or roads, accurately prepared, graded, and leveled as much as possible, for the passage to and fro of the locomotive-bridge, which, by means of its great weight, endless railway and broad-bearing roller-wheels consolidates and hardens the surface of the bare ground, soil, or sod into permanent roadways or tracks never to be broken up or cultivated, but to be used and kept in repair solely for the purposes of this invention. By these means I am enabled to entirely dispense with the employment of all parallel lines of iron railways, wooden sleepers, ties, &c., arranged upon the cultivated land, except for the two headland tramways, which may be distant from one to several miles apart, as circumstances may require. To enable, also, the steersman to have an unerring line to steer by, I cause to be indented and impressed into these permanent paths, one or more shallow and slightly-beveled grooves formed by projecting rims or flanges attached to the centers of the peripheries of the bearing-wheels, or at the sides or other convenient places when I am obliged to use the hauling wire ropes and naked bearing-wheels alone; but when employing the endless railway alone or in conjunction with the wire ropes, I then use small pilot-wheels in front and rear of the endless railway capable of adjustment, for the same purpose of indenting shallow grooves into the hard ground at or about the centers of the paths. In both cases, however, I add a small pointer three or four feet long in front of the wheels and endless railway, attached to the locomotive-bridge, and as close above and in line with the shallow grooves as possible, so that the least inclination to the right or left can be distinctly seen from the top of the locomotive-bridge by the steersman.

V. In the harvesting of the grain crop, three or more plans can be adopted to suit the several countries and the exigencies of the different climates, viz:

First. The grain can be reaped and allowed to fall on the revolving webs or aprons of the reaper, carried up and delivered on the locomotive-bridge in a continuous swath, ready to be bound into sheaves by means of any of the recent self-acting appliances now so successfully used in combination with the ordinary two-horse reaper. If thought necessary, these bound sheaves can be carried on the locomotive-bridge a short distance to save hand-labor, then thrown off behind to the laborers to be set up in stooks for drying. When all the reaping of the grain on the farm is completed, and the sheaves of grain are fit for the stack-yard, they are carried there first by the locomotive bridge itself as far as the headland, and then by a headland-truck (one for each headland) constructed about the same height, breadth, and length as the locomotive-bridge, which truck does all the carting on the headlands to the granary, traveling on an iron railway or tramway. This truck is also employed for the purpose of carting fuel and water required for the steam-engines on the locomotive-bridge from the barns or other buildings adjacent thereto.

Second. Or when not intended to be put in stacks, but eventually to be thrashed in the field when dry enough, the grain can be first reaped and then left on the ground to dry in a continuous swath, to be thereafter picked up by the revolving aprons on the reaping-frame, carried up and passed through the several thrashing-machines on the locomotive-bridge, the grain being gathered into bags at the sides of the thrashers in the usual way, the thrashed straw allowed to fall on the ground behind the shakers, to be dug in, burned, or carted off as circumstances may demand. The bags of grain are carried on the locomotive-bridge to the headland, to be then shifted onto the truck already mentioned, by means of small hand-trucks to avoid lifting and handling, and a fresh quantity of empty bags taken on board from the headland-truck, repeating the same operation until the whole work of harvesting is completed.

Third. In harvesting in very warm climates, where the grain is fully ripe and dry before reaping, such as Australia, India, California, the Western States, and the Northwest Territories of Canada, it is very often the practice to thrash the grain immediately after it is reaped, first binding it into sheaves—for the sole purpose of making it more easily handled— the thrashing-machine following closely after the reapers in the same field, the thrashed grain bagged and sometimes shipped the same day on very many large farms. Now, in this my third plan of harvesting, it is intended by these improvements to do away entirely with the work of binding the sheaves and the employment of hand-labor to handle, feed, and attend the thrashing-machines, horse-powers, &c., and in lieu thereof to lead and carry the crop of grain, immediately after it is reaped, in a continuous swath up the slatted and revolving aprons to the several thrashing-machines, the grain being bagged and carried to the headland as already mentioned, and the straw allowed to fall behind the shakers, spread out in a good condition to be burned, if thought fit so to do, or raked up by rakes attached to the locomotive-bridge at any future time, and carried to the headland, if so required, to be stacked there or drawn to the barn by the headland-truck. It will thus be seen that these long headland-trucks are the only connecting links between the locomotive-bridge working on the land and the buildings composing the farm-steading on each headland, for the express purpose of carting all the crops off the soft cultivated land, avoiding all the injurious effects of treading, poaching, and in several other ways consolidating the surface of the soil, first by a variety of traction implements, then by men and animals. The long headland-trucks are therefore one of the most important elements in carrying out this invention, namely, dispensing with a very large portion of the constant heavy and tedious manual labor now required to successfully farm any paying quantity of land, and, with the slight exception of two horses for the headlands, of doing away entirely with the necessity of employing animal-power. For it is well-known that one good horse can, on a good moderately level tramway, draw at least a ten-ton load at each trip, which will be quite sufficient to keep both the locomotive-bridge and the two headland-trucks well employed, and, when working in harmony with each other, ought and can do all the carting off the land required for a twelve-hundred acre farm, so that as far as housing all the crops in the granaries and barns and the supplying the steam-engines on the locomotive-bridge with fuel and water are concerned two horses are all that are needed—one at each tramway and headland.

VI. In the harvesting of root and such like crops, several plans will readily suggest themselves to the intelligent farmer and market-gardener to suit different circumstances, as there are ample means provided for attaching to both sides of the locomotive-bridge and to the duplicated angle-iron frames, used for the reaping and mowing, any of the numerous and improved potato and turnip diggers, and landing the roots (as described for the grain-crop) onto the locomotive-bridge, which has a clear and unobstructed deck of fifty feet long by fifteen feet wide, with plenty of power close at hand to do all the work required for such purposes. The angle-iron frames above mentioned are made capable of adjustment vertically, and may be raised and lowered the required distance above the ground to suit the crops. They are also provided with wooden flooring the whole length, so as to enable them to carry several working-hands to do most of the light work required for a root, fruit, and cotton crop—such, for instance, as weeding and thinning out roots of all kinds, picking and gathering strawberries, cotton, &c., the onward progress of the locomotive-bridge being set to travel in all such cases very slowly to accommodate that particular class of work.

VII. Having described the manner of hoeing and earthing up between the rows of grain crops, &c., where the seeding and drilling is continuous, and where the locomotive-bridge has only to be transferred endwise on the two headland-tramways to take up a new fifty-feet strip of land for all the purposes mentioned, but where the crop is not sown in drills or rows, but planted in hills, like the tea-plant, from four to six feet from center to center, or sometimes, like Indian corn, of a much less distance, and where transverse hoeing, &c., is required, and has to be done as well as the longitudinal hoeing, I then employ a low turn table, made in the usual manner, either with or without anti-friction rollers, about eight feet in diameter, and place it on one of the headlands, but at one of the corners of the farm, (so as to take advantage of a side road and open space to get turning room,) and place the center of the turn-table in the center of the outside path. One of the endless railways is made to mount on top of the turn-table, is scotched there, and thrown out of gear with the engine, the endless railway at the other end of the locomotive-bridge being driven round until the locomotive-bridge assumes a position on the side land of the farm, at right angles to where it had worked before, to repeat the same class of work transversely, except that at every fifty-feet strip of land the vertical rotating tools are lifted up out of the ground simultaneously (by proper machinery shown and described hereinafter) to avoid cutting and breaking up the permanent paths already described and alluded to, and so invaluable for the purposes of this invention. The transverse work is necessarily more expensive to do and tedious to perform, on account of having to lift all the cultivating-tools so often at every pathway. The moving of the locomotive-bridge endwise on the side lands is done in the same manner as on the headlands, except that there is no necessity of laying down several miles of railway the whole length of the farm; but only a stretch about double the length of the locomotive-bridge, made in convenient lengths for the horses to move endwise at each successive time the locomotive-bridge comes back to take up a new strip to work upon. Two low trucks are employed to move the bridge on the tramway on both the headlands and the side lands. (Hereinafter shown and described.) The endless railway is also applicable for all kinds of traction-engines to secure a bite and propelling-power for the driving and bearing wheels traveling over farm-land and on common roads, especially when plowing and cultivating. When the traction-engine is employed in plowing, &c., I adopt, with a slight alteration, the turn-table previously described for turning the locomotive-bridge round from the headlands to the side lands or elsewhere. For instance, if from outside to outside of the two endless railways be twelve feet wide, and the engine is plowing a width of fourteen feet, then the turn-table will be made large enough to accommodate one side of the endless railway when mounted on it, to be about a foot distant from its central pivot, so that when the endless railway on the opposite side is driven round a half-circle the engine and railway will be exactly in the proper position to take up a fresh strip of land to plow, &c., immediately alongside the previous stretch operated upon.

With the aid of the accompanying drawings, I will now proceed to give a more detailed description of the several parts when put together in their proper order, the same letters referring to similar parts in all the drawings.

Figure 1 is a front longitudinal elevation, and Fig. 2 is a plan, of my modern steam-farmer as it would appear when hoeing or cultivating a strip or stretch of land fifty feet broad, or including a space taken from the inside of one set of bearing-wheels to the outside of the other set on the opposite end, of about fifty-four feet. The endless railway is left out in this view, but shown more in detail in a subsequent drawing, for the sake of clearness.

$a$ $a$ are the paths or roadways, prepared, graded, and their surfaces hardened and consolidated, as already described, laid out in lengths as long as possible to avoid the too frequent changes and transfers of the locomotive-bridge at the headlands, because, in applying steam economically to the work of the farm, the saving of time incurred by stoppages and interruptions is the essence of the entire undertaking.

$b$ $b$ are the projecting rings or rims on the bearing-wheels $c$ $c$, for the purpose of impressing or indenting shallow grooves $h'$ $h'$ in the paths, from one to two inches deep and slightly beveled upward and rounded off at the corners, in order to make a visible clean cut and an unerring line for the steersman to steer by, for, lacking some such like contrivance, it would be almost impossible to drop the seed in line in the drills or work the series of vertical tools between the rows of grain, &c, or, in fact, to carry out the intention of this invention to the extent desired. The vertical and tubular spindles (lettered $d$) represent the arms or handles, on the lower ends of which the series of revolving and cutting tools (marked $e$) are screwed onto or otherwise securely fastened by any of the well-known appliances. On the left end of this view I have shown the tools $e$, about six inches in diameter, first working between rows of the wheat-plant two or three inches above the ground, and then farther to the right, working up to two or three feet high, twelve inches apart. In the center of the view every alternate spindle $d$ is allowed to remain idle, while their mates carry and work tools from twelve to eighteen inches diameter, as found necessary, in rows of turnips, sugar-beets, and potatoes, two feet apart. Farther toward the other end of this view is seen the reciprocating harrow $f$, three feet long by one foot broad, having thirty-six sharp-pointed steel teeth suspended and propelled by the two six-inch cranked disks $f^3$, harrowing and producing a finely-raked seed-bed four feet broad, after which follow the seeding-tubes, set apart the required distances to suit the crop. (More clearly shown on a larger scale in a subsequent drawing.)

$g$ is a subsoil scuffler, capable of cutting, stirring, and lifting up the subsoil two or three inches (but not inverting it) from a depth of eighteen inches, or more, if required. (Hereinafter shown in Figs. 17 to 20.) This tool $g$ is well adapted for summer-fallowing and invigorating old exhausted heavy wheat-lands, breaking up and stirring the subsoil hard-pan, invariably formed and caused by the long and constant use of the plow and similar traction-instruments. The working-tools $e$ $f$ $g$ can be made of any particular pattern, size, or shape to suit the fancy or whim of the purchaser, without detracting from the principle in the least; but what I wish to base my claim on, and for which I am seeking Letters Patent, is in introducing, for the first time, to the farmer and agriculturist a motive-power apparatus having a series of revolving and reciprocating sharp cutting-tools suspended over the land to do their work, and producing a perfect seed-bed, with the seed deposited at one and the same time of operation, and not bearing or treading on the surface of the land, as plows and similar traction implements necessarily have to do to accomplish their work, besides having to go over the land several times for an inferior result.

The spindles $d$ slide up and down in the series of cylinders or shafts $h$, on the upper ends of which are keyed fast the miter-wheels $i$, gearing at right angles into the miter-wheels $j$, which latter are also keyed fast to the long horizontal and tubular main shaft $k$, seen dotted through the wooden box-covering, partly broken to expose a portion of the main shaft and miters. This box-covering is made of stout planking, the top side of which is capable of removal for purposes of oiling and access to the shafting and gearing, and is firmly fastened to the flooring $m$ of the locomotive-bridge. $n$ are a series of light cast-steel transverse brackets, through which work and rotate the upright shafts $h$, sustained in their positions by the means of broad collars fast on their lower ends. The manner of self-adjusting the rotating implements to the proper depths they would have to penetrate the surface of the soil, also the adjusting of the seeding-tubes, and the manner of lifting and lowering the spindles $d$, telescoping into the cylindrical shafts $h$, will be more fully explained hereinafter by means of separate drawings.

$o$ is the seed-box, placed and fastened on top of the box $l$, partly drawn and broken off at each end, the balance of the length being only dotted in along with a transverse sectional view. Shaft $o^*$, which reaches the whole length of the seed-box, and is driven at the ends by the pitch-chain $o^2$ in gear with the bearing-wheels $c\ c$, is also better shown in the separate drawings last mentioned.

I now come to describe the construction of the locomotive-bridge, which is formed and made up of four angle-steel latticed and longitudinal girders, $p$, and the transverse girders of similar make, $q$, and angle-braces $r$, (Better seen dotted in plan, Fig. 2, and also more fully shown in cross-section, Fig. 3.) The whole is stiffened laterally, and held more firmly together by means of the three-inch tongued-and-grooved flooring $m$, which is, previously to bolting on, well creosoted to resist the action of the weather. It is computed to carry a load of twenty tons to the headlands, when equally distributed over the flooring between the spaces occupied by the motive power at each end—that is, the product of a crop of wheat two miles long and fifty feet wide, or about fourteen acres at forty bushels to the acre, in addition to the weight of machinery, &c. $s\ s$ are two small sheds or cabooses—one at each end—made of some non-combustible material, to protect the machinery connected with the motive power from dust, &c., and also to prevent any fire taking place from sparks or coals of fire escaping from the boiler-furnaces, besides having an efficient spark-arrester attached to the smoke-stack. The exhaust-steam is conducted into the water-supply tanks underneath the flooring—three in number—at each end of the locomotive-bridge instead of into the smoke-stack. The vertical engines $t\ t$ are placed as close as possible in front of the boilers $u\ u$. The spur and miter gearing, with friction-clutches, &c., both for driving the main shaft $k$, and the gearing employed for propelling the locomotive-bridge, of which there are three plans, hereinafter referred to, the bearings for all the gearing are supported at each end on the two transverse girders $g'\ g'$, which girders are then in their turn supported on the transverse channel-iron frame-work $v\ v$ of the bearing-wheels. Although not shown on the drawings, the engines are intended to be properly balanced on each side of the cranks.

$w\ w$ are two fly-wheels, which may be used for other purposes than those already specified.

$x\ x$ are two small winding-drums—one at each end—for the sole purpose of hauling the locomotive-bridge endwise on the headland railway $y$, as seen in Fig. 3, by means of the small wheels $z\ z$ between the three large bearing-wheels $a'\ a'\ a'$. These two wheels $z\ z$, one set at each end, are lifted up when not wanted, and pressed down on the headland railway when required to suspend the locomotive-bridge to move it endwise, by means of the two hydraulic cylinders $b'\ b'$.

In Figs. 3 and 4 the manner of attaching the cylinders $b'\ b'$ and wheels $z\ z$ to the frame $v\ v$ is more clearly seen. An important point in the design and construction of the locomotive-bridge is the placing of all the weight of the driving-gearing and motive-power machinery, also the fuel and water, immediately over and outside the two points of suspension or main bearing wheels, acting to a large extent as a counterpoise to all the working, cultivating, and harvesting machinery suspended between these two points, including also the heavy load it has to carry to the headlands at harvest time. This overhanging weight will have a good effect in equalizing the pressure on the bearing-surfaces of the endless railway, the wheels and the paths $a\ a$ producing a better bite or friction on the latter, and obtaining more steering-power. $c'\ c'$ are levers—two at each end—connected by the rods $d'\ d'$ and the spur-pinions and rack $e'\ e'$, placed under the flooring for the purpose of throwing the large and powerful friction-clutches $f'\ f'$ out of gear. Retaining the clutches in gear is done by the powerful spiral springs $g'\ g'$, encircling the crank-shaft and pressing against the movable disk of the friction-clutch. It is by and through these two levers and one clutch at each end that I am enabled to control the steering of the locomotive-bridge with only one man, the action of steering being as follows: The steersman stands alongside the two levers $c'\ c'$ in front and at either end of the locomotive-bridge, immediately behind and above the front pilot-wheel and a small pointer, shown hereinafter, and keeps a good look out that both the latter and the shallow grooves $h'\ h'$ on the paths $a\ a$, already mentioned, keep in line together; but as soon as he perceives there is a tendency of the pointer, in front of where he stands, inclining toward the center of the strip of land then being operated upon, then it is a certain indication that his end of the locomotive-bridge is progressing too fast, and that it is in advance of the opposite end. He accordingly retards its progression by merely throwing out of gear for a moment the clutch behind where he stands until the pointer $i^5$ and the shallow groove $h'$ agree to fall into line again. If, on the other hand, the pointer should incline to the outside of the strip of land operated upon, then the steersman reverses his last action to secure the contrary result. As it will be almost impossible to maintain the same pressure of steam in both boilers at such a distance apart, I fix a small iron pipe, $i'$, under the flooring $n$, (seen dotted in plan, Fig. 2,) the open ends of which pass up through or alongside and enter at near the top of the steam-spaces of both boilers, equalizing the pressure of both boilers to within a pound or two, keeping both the cylinders and governors up to their work, preventing any backlash in the gearing, giving equal progression to each end of the platform-bridge, and thereby securing a more correct steering. $j'\,j'$ are the levers supplied to the two friction-clutches $k'\,k'$, in connection at each end of the main shaft $k$, which is driven by the two engines with two separate and distinct sets of spur-gearings, to suit the varied speeds the cultivating implements may require, or allowed to remain idle, if necessary, while the propelling-gear may have to be in use.

Figs. 6, 7, and 8 are three views of my improved endless-web railway, which is confidently expected to take grip or bite enough on the surface of the permanent paths $a\,a$ to absorb all the power given out by the two engines that will be required for propelling the locomotive-bridge over moderately level lands; but where the land is very hilly and swampy, and where the web of transverse planks might and is very likely to slip and slide through watery mud, further, when all the power of the engine would be applied for any class of work requiring traction only—such, for instance, as cutting one or more deep trenches for pipe-tile draining, or open trenches for surface-draining—which is a class of work very necessary and important in an agricultural point of view, in all such cases just mentioned I recommend the addition of two wire ropes anchored ahead, and attached through winding-drums at each end of the platform-bridge, as shown in Figs. 22, 23, 30, and 31, hereinafter more particularly described. Fig. 6 is a transverse sectional elevation of the locomotive-bridge, taken on line A B. Fig. 7 is a horizontal section on line C D, and Fig. 8 is a front elevation. It will be seen that the two outside bearing-wheels $c\,c$ are both driven simultaneously, and always work in unison with each other, no matter in which direction they are driven, by means of the four powerful and endless pitch-chains, $i'$, which gear into, first, the four large pitch-chain wheels, $m'$, fast on the two bearing-wheel axles $n'$; the pitch-chains $i'$ then gear with the two double-toothed pitch-chain pinions $o'$, fast on the slow-motion shaft $p'$, connected through the counter-shaft $q'$ to the engine-shaft $r'$, all driven by stout spur-gearing properly speeded, as seen and drawn in full in front elevation and with dotted lines in transverse section. The center bearing-wheel $c$ and its two small neighboring wheels, $s'$, are kept in their places by the carriage-spring $t'$, the three of them bearing up about a third of the load to be carried. They first prevent the planks $u'$ from buckling up on uneven surfaces, and losing their bite and hold on the ground; and, secondly, distributing the load on five bearing-wheels instead of two. $w'$ are the pilot-wheels already referred to—two at each end and side of the locomotive-bridge—with their central projecting rims, $b$, to form and indent the grooves $h'\,h'$ on the permanent paths, for the purpose of giving the steersman an unerring guide-line to steer by, either by night or day. They are loosely but firmly attached to the channel-iron transverse frames $r\,r$, and are raised and held there or lowered, when required, through the double set of jointed levers $y'$.

I am aware there are several ways and plans that a steering guide-line can be marked on the permanent paths, other than those I have shown and described; but I thought it unnecessary to mention them, judging those shown quite sufficient, supposing them to be the least expensive to keep in repair and the most unerring for the purposes sought to be attained. The pointer $i^5$, already mentioned in connection with the steering, is merely a thin piece of wood, slightly bowed at one end, very similar to one of the ribs forming the cradle of a cradling-scythe. The two outside bearing-wheels $c\,c$, at each end of the locomotive-bridge, are turned up true on their own axle-centers, and are cast or otherwise made with semicircular indentations $z'$, to receive and fit loosely the broad steel or malleable-iron hinges $a^2$, which are securely riveted through the two-and-a-half inch hard-wood planks $u'$ to countersunk steel plates or washers on the under side, as well as through the hinges themselves, $a^2$, on the upper side, which are made slightly concave to fit the circle of the bearing-wheels, as shown in Fig. 6, the whole of the planks $u'$ being so hinged and firmly held together that they form a continuous web of endless bearing-surface, their own weight, as they pass round on top, being sufficient to bring up any slack there may be, and the excessive strain on the joints of the hinges $a^2$ in doing their work is prevented a good deal by their close fit and the large frictional surface obtained through the two half-diameters of the two outside bearing-wheels $c\,c$.

Fig. 9 is a cross-section of the two middle and longitudinal girders, taken through the vertical spindle $d$ and the vertical cylindrical shaft $h$, showing the manner in which the lifting, lowering, and self-adjusting of the rotating tools $e$ are performed. $n$ are the brackets, cast with journals, to receive the ends of the shafts $h$, in which the latter work and are sustained in their vertical position, bearing on the broad collars $h^2$. The shaft $h$, at its upper end, carries the miter-wheel $i$, revolving round the open end of the T-pipe $b^2$, kept water-tight by means of the tapering brass, bush, or gland screwed and fastened into the shaft $h$. The two hydraulic pipes $d^2$—one at each side of the main shaft $k$, inside the box-covering—connect with hydraulic cylinders placed alongside the steam-engines at each end of the locomotive-bridge. These two cylinders do all the lifting and lowering connected with the bridge and all connected with the cultivating implements. Both the hydraulic cylinders and the pumps are of the common type usually employed in such work, and I have therefore thought it unnecessary to show them on the drawings, for the sake of clearness. $c^2$ is a tube connecting the under side of the piston $f^2$ with the well $g^2$, formed at the upper end of the cylindrical shaft $h$. The tubular rod $d$ works through hydraulic packing at $i^2$, forming an abutment for the fluid to press against the working-piston $h^2$, raising the tubular rod $d$ with its rotating implement, fast at its lower end, working loosely through a collar and stud-pin attached to the center of the balancing-beam $j^2$, the latter being attached loosely by bolts at each end to the upright tubes $r^2$, which in their turn carry the two small rollers $l^2$, by means of the forked and cranked ends shown. Guide-holes are made in the brackets $n$ and the lugs $m^2$, through which the tubes $r^2$ are guided, and are free to rise and lower, as acted upon by the rollers $l^2$. It will be seen that the latter sustain all the weight of the working implements, tubular rods $d$, and piston $h^2$, besides the weight of their own attachments. The stud-pins $n^2$, on the inside of the collar of the beam $j^2$, are furnished with loose steel thimbles, that work in a groove turned on the end of the spindle $d$. The latter passes through the head of the cultivating implement $e$, so as to permit the free flow of the atmosphere into the cylinder-shaft $h$ above the piston $h^2$, and, although there will not be much weight on each of the rollers $l^2$ pressing on the land, still there will be quite sufficient to keep them down to their work and sustain the rotating implement $e$ to its proper depth in the soil, the several depths being regulated, when required, by the sets of graded holes on the ends of the upright tubes $r^2$, to which the ends of the balancing-beam $j^2$ are attached loosely. If, however, the pressure is to be taken off the surface of the earth immediately after it is pulverized, that particular roller $l^2$ can be lifted up a few inches out of work and fastened by a pin across and on the top of the bracket $n$. These changes involve a loss of time at each headland to alter the pin from one side of the bracket $n$ to the other, and are not desirable if they can at all be dispensed with. The small rollers $l^2$ are made double, to permit the balancing-beam to work freely, and the faces of their tires can be made the width required for their work. From the foregoing it will be readily seen that as soon as the pressure is put on in the hydraulic cylinders on top of the locomotive-bridge, passing through two tubes, $d^2$ and $e^2$, to the under side of the piston $h^2$, (the pressure being much in excess of the weight to be lifted,) all the apparatus attached to the lower end of the tubular spindle $d$ will be lifted up and sustained there as long as necessary, and then as soon as the pressure is taken off and the proper quantity of fluid pumped, sucked, or withdrawn back out of the cylindrical shaft $h'$, the tubular spindle $d$ will gradually fall down until sustained on the soil by the rollers described.

In describing the above lifting, lowering, and self-adjusting apparatus I would here remark that the self-adjusting rollers $l^2$ are intended more for the purposes of sowing the seed and adjusting the seed-tubes to the proper depth, also doing now and then some of the more precise work between the rows of grain, than to be employed for all and every class of cultivation on the farm, for it is presumed the surface of the land, after being worked by this apparatus for a few seasons, will be sufficiently level and will not require the self-adjusting rollers, but merely the lifting apparatus alone, when the depth of cultivation is regulated by simply fastening the two cross-pins through one of the graded holes shown at the upper ends of the upright tubes $k^2$ for the proper depth required, the pins resting on and carried by the cross-brackets $n$, but free to move upward when required to be lifted. I have shown another mode of raising and lowering the cultivating implements in Fig. 24, to be hereinafter described; but I prefer the hydraulic system, as suiting also for raising and lowering all the other work already mentioned.

Fig. 10 is a side and Fig. 11 an end elevation of the long headland-truck employed in conjunction with the locomotive-bridge in carting off all the crops off the land to the several granaries, barns, and other buildings composing the farm-steading. It is a most important and the only link by which the locomotive-bridge is enabled to remove the harvested crop to its proper destination on the farm. This truck has to carry as heavy a load as the bridge, and is composed of three steel lattice-girders, $a^3$, of about half the depth of those used of the locomotive-bridge; but to make up for that it has a third set of central bearing-wheels, $b^3$. All the three sets of wheels $b^3$ are arranged and carried by the transverse channel-iron girders $c^3$, the axle-boxes of which are similar in make to those of the locomotive-bridge. $d^3$ are two water-tanks—one at each end—to supply the steam-engines with water, the coal being brought in bags and shifted from the truck to the locomotive-bridge by means of the small hand-trucks already referred to for shifting the bags of wheat. The tanks, when delivering the water, are placed alongside those of the locomotive-bridge, and, being upward of a foot higher, once the connection is made through a short piece of hose four or five inches diameter, the fresh supply of water is soon transferred from one set of tanks to the other. Enough at least for half a day's work can be brought at one trip from the farm-steading. So also for the supply of coal or other fuel.

Figs. 12 and 13 are a plan and longitudinal elevation of the locomotive-bridge, showing the rims or flanges $b$ at each side of the bearing wheels $c$, the latter being made in two halves, leaving an open space to receive the grooved sheaves $p^2$, which work loose on the axles of the inside or middle bearing-wheels $c$. (Better seen in Fig. 21.) The wire rope $r^2$, after passing a half-round on the sheaves $p^2$, is then carried up and passes two-thirds round the grooved sheaves $q^2$, working in bearings carried by the frame $s^2$. It is then led down, crosses, and is passed a half-round on the sheaves $p^2$ again, and is then led out in the opposite direction to which it entered, held up off the ground and guided by the two double-concaved thimbles $t^2$, as indicated by the arrows. The sheaves $q^2$ are made fast to the spur-wheels $u^2$ which are driven by the spur-pinions $v^2$, in connection with the gearing on the engine-shafts, similar to that shown and described in Figs. 1 and 2. $w^2$ are two low headland-trucks, strongly built, as shown, and is the plan adopted for transferring the locomotive-bridge on the headlands from one strip of land to another when the endless railway is used instead of when the naked bearing-wheels and wire rope are employed alone, as here shown. The locomotive-bridge, as already described and shown in end view, Fig. 3, is lifted high enough to clear the rims or flanges $b$ off ground by means of the two hydraulic cylinders $b'$, transferring all the weight of the locomotive-bridge onto the two trucks $w^2$ when, as already mentioned, both trucks and locomotive-bridge are hauled ahead on the headland by means of the small winding-drums $x$ and wire rope anchored ahead. The main shaft $k$ is driven similar to that already described in Sheet 1, except that in some cases I use spur-gearing $y^2$ in conjunction with the miter-gearing $j$, as found most convenient. The pitch-chains $z^2$ and $z^3$, one set at each end of locomotive-bridge, (better seen in cross-section, Fig. 14,) are intended to be applied to a smaller class of locomotive-bridges when employed for a lighter class of work—such as for market and fruit gardens, &c. The pitch-chain $z^2$, it will be seen, is prevented from getting out of gear and kept up to its work by the four small grooved rollers $z^4$ with the three pitch-chain wheels $z^5$, fast on the axles of the bearing-wheels $c$. These two views are very similar to those shown on Sheet 1, except the parts described.

I will now explain my mode of operation: First, by laying out and adapting the arrangement of the permanent paths $a$ on a farm, without the necessity of resorting to the very expensive employment of any iron rails, wooden sleepers, &c., which would cost at least ten times the price of the best farm in the country; second, by adapting the unerring line-mark indented on the said paths $a$ for the purposes of steering; third, by the design and application of so locating and placing the motive power and then attaching the cultivating implements to a steel lattice-girder bridge, with the ends overhanging, as to obtain a clear and unobstructed deck or flooring for the several implements and machines to be employed for the purposes of accomplishing the work of the farm, such as cultivating, seeding, harvesting, and carting the crop off the land; fourth, by the use and application of an endless-web railway, as shown and described, for the purposes set forth, also for the use and application, when thought fit, of the arrangements for propelling the locomotive-bridge with wire rope mounted on winding-drums and large cart-wheels, as well as with grooved sheaves, as shown, for the purpose of aiding the locomotion.

Fig. 15 is a front view of my digging-machine, which has already been the subject of Letters Patent, with so much of the locomotive-bridge and main driving-shaft $k$ at one end as is necessary to exhibit the manner of driving the digging-cylinder and its connection with the locomotive-bridge. Fig. 16 is an end elevation of the same, both views showing the digging-cylinder lowered about nine inches in the ground. They are made about twelve feet six inches long, one placed at each end of the locomotive-bridge with their working spades, picks, or mattocks $v'$ facing in one direction, digging two strips of land at one time, amounting together to twenty-five feet, when on the return journey the middle strip of twenty-five feet is dug up by another pair of cylinders having their working-tools facing in the opposite direction, those cylinders placed and carried at the end, each pair working alternately and taking two bouts to complete one strip of land of fifty feet. When invigorating exhausted heavy clay-land by digging to an extra depth, so as to bring up to the surface the subsoil thoroughly inverted, that the action of the atmosphere, frost, and rain may ameliorate it and render it more fertile, it may be necessary to use only one cylinder at a time, as this class of work takes a great deal of power and will not be required to be repeated on the same land for a long time, for it is presumed the summer cultivation between the rows of grain, &c., with the vertical rotating tools will keep the land in good heart, especially if green-manuring be resorted to, as before mentioned. $x'$ is a shaft with miters at each end, gearing with the two inclined shafts $e^3$, connecting with the main shaft $k$. The digging-cylinder $f^3$, on which the spading-tools $v'$ are bolted from the inside, is made of boiler-plate one-fourth of an inch thick, thirty inches diameter, the tools $v'$ being about twelve inches long by eight or nine inches wide, disposed on the cylinder in a zigzag fashion, and digging about two inches outside each end of the cylinder, so as to allow it to lower, when at work, into the trench or cut formed by the tools $v'$. The digging-cylinder and the shaft $x'$ are connected together at both ends by the two pitch-chains $g^3$, and pitch-chain wheel and pinion $h^3$, completing the connection with the main shaft $k$. The channel-iron frame $i^3$ is carried on the ends of the shaft $x'$, which work in bearings carried by the brackets $j^3$, fast on the locomotive-bridge, and acts as a center for raising and lowering the channel-frame $i^3$ by means of the hydraulic cylinder $k^3$, acted upon by the hydraulic machines already spoken of next the motive power at each end of the bridge.

Fig. 24 is another mode of raising and lowering the tubular spindle $d$ by means of the two horizontal shafts $s^3$, placed one at each side of the spindles $d$ and extending the whole length, and carried by the cross-pieces of studding $t^3$, resting at each end of the middle girders, $p$. Each spindle $d$ is provided with a loose collar attached to the double upright racks $u^3$—one each side of the spindle—which gear into the two double pinions $v^3$, fast on the ends of the shafts $s^3$. These two shafts are worked by gearing and clutches (not shown) at each end, in connection with the main shaft $k$, and are thrown into and out of work by levers attached to the flooring. Fig. 25 is a sectional view on a larger scale, broken off above the bracket $n$, of the rotating tool $e$, with its spindle $d$ telescoping into the cylindrical shaft $h$, and the box-covering $l$, and the seed-box $o$. $w^3$ $w^3$ are two feathers fast on the end of the shaft $h$, for driving the spindle $d$, which have grooves to receive the feathers cut the distance required to raise and lower the tools $e$. Fig. 26 is the cast-iron head, (shown in plan,) to which the revolving tools $e$ are attached, already referred to.

Fig. 30 is a side view, and Fig. 31 is a plan, of one end of the locomotive-bridge, showing the manner of driving and the connections made with the portable winding-drums mounted on large cart-wheels for the purpose of winding up the two wire ropes $r^2$ in hauling and aiding the locomotion of the locomotive-bridge, when required, as already stated. The winding-drum $x^3$ is fast on its axle, working in bearings in the naves or hubs of the large cart-wheels $y^3$. The self-coiling apparatus $a^4$ is driven through the two pinions $b^4$ in gear with the two large spur-wheels $c^4$, fast on the drums, the latter, as is shown, being driven by the two spur-pinions $d^4$, fast on the overhanging ends of the shaft $e^4$, which is carried and works in bearings carried on the projecting ends of the bearing-wheels' frame $c^3$, which is here shown made in wood instead of channel-iron, as already described. The driving-connections for the winding-drums, one set at each end of the locomotive-bridge, are made complete by the short shafts $e^4$, which carry the requisite miter-gearing $f^4$ to connect them with the inclined shafts $c^3$, which are driven by the main shaft $k$. The horse-shafts $g^4$ are continued beyond the large wheels $y^3$, and are attached loosely by the hooked ends to the shaft $e^4$, and kept in their places by the sliding bars $h^4$. The wire rope $r^2$ is about a mile long, sufficient for a one-horse load, and is anchored ahead on the permanent paths $a$, as shown, $i^4$ being a round piece of hard wood attached at its upper end to the rope and dropped into the vitrified pipe $j^4$, which is about six inches diameter and about thirty inches long, let in and sunk a little below the surface of the path and made to fit the hole as much as possible by using a post-hole auger, as it is a permanent fixture. The two arrangements now shown and described for obtaining positive locomotion under circumstances and for reasons already stated by means of winding up wire ropes are both expensive and involve a loss of time in manipulating, and are therefore not desirable if it be possible to overcome the difficulty by draining the wet spots and otherwise preparing the paths to accommodate the endless railway for purposes of traction.

By reference to the diagram Fig. 23, exhibiting in plan three strips of land fifty feet wide, with their paths $a$ supposed to be four miles long, as shown by the small circle representing the several places to anchor the rope, the action and manipulation of the drum will be more clearly understood. It will be seen that the locomotive-bridge in the position of the headland (lettered A) is supposed to be ready to start on its one-mile stretch, with its two empty winding-drums hitched on, the wire rope having already been laid down on the paths by the two horses $k^4$, now standing at rest with their harness on, waiting for the locomotive-bridge to come up to them, which will take about one hour. In the meantime, and while the work is being done on the first mile, the second pair of horses, $l^4$, with their drums, have laid down the ropes on the paths for the second mile, brought back the empty drums, standing on one side to allow the first pair to pass them, ready to hitch on their drums, by merely drawing back the sliding bars $h^4$, raising the front ends of the horse-shafts and hooking onto the shafts $e^4$, then walking slowly back to the anchorage at the second mile to repeat the same action as the first pair of horses did, and as soon as they got hitched into the shafts and got unhitched from the locomotive-bridge proceeded at once with their loaded drums to lay down the third mile of ropes, and so on for the four miles, more or less, each pair of empty drums allowing the full ones to pass them until they arrive at the other headland, where the locomotive-bridge, after being transferred to a fresh strip of land contiguous to the last operated upon, assumes the position lettered B, and the work and action described are repeated until the whole is complete.

Fig. 37 is supposed to be a diagram of a farm one square mile. The barn is placed on the edge of the front headland in the center, and the strips of land fifty feet wide extending the full half-mile at each end of the barn. The tramway passes through the barn for carting purposes, and the barn ought to be made long or big enough to accommodate and protect from the weather both the locomotive-bridge and headland-truck, besides having on one side the requisite bin-room for the grain. The flooring of the headland-truck being at least six feet high, and coming close alongside of the bins, can easily discharge its load of bags of grain by means of the small hand-trucks used for such purposes.

I have already described and referred to the two small diagrams on this sheet lettered "Reaping" and "Thrashing and Carrying," and it only remains for me to describe the other two small diagrams lettered "Harrowing and Seeding," and "Drill Cultivation." The latter diagram will help to explain in what manner the ropes and drums are worked when the grooved sheaves $q^2$ are employed to drive or draw the wire rope for the purposes of propulsion, instead of the plan last described. In this plan only two men and two horses, with three miles of rope, are used at the same time. The winding-drum $x^3$, shown attached at one end at the rear of the locomotive-bridge, as will be seen, is supposed to be in the act of winding up the rope as it is given off the sheaves $q^2$, traveling toward the headland in rear of the farm. As soon as it reaches there, and moves to the next strip of land on the return bout, the wire rope that was acting on the right hand is shifted through the sheaves at the left hand, and the right-hand end takes up a fresh mile of rope previously laid down by the second man and horse, (not shown,) ready with his empty drum to be hitched on and follow the locomotive-bridge to the front headland. The full drum, with man and horse, travels down on the rear headland to the outside path of the strip next to be operated upon, and lays down his mile of rope, and is ready to meet and be hitched on behind the locomotive-bridge at its next bout, and so on till the work is finished. In the diagram lettered "Harrowing and Seeding," all I wish to illustrate is the feasibility of working by night as well as by day, for all the purposes set forth and claimed for this invention. $m^4$ is intended to show the electric light suspended at the top of a pole carrying the electric wire $n^4$ from both ends of the locomotive-bridge, as swung to the front or rear, as required; or two lights may be swung in the same manner—one from each end; or four smaller ones—one at each corner—may be used, the dynamo-machine being worked from one of the engines.

Fig. 32 is an elevation on a larger scale of one of the reciprocating harrows $f$ (shown six inches in the ground) with its attachments to the tubular spindle $d$, by means of the crank-disks $f^5$, also part of one end of the neighboring harrows, with its crank facing in the opposite direction, working with just room enough to clear each other at the ends. All the twelve harrows are similarly attached to the vertical spindles, thoroughly harrowing the span of land between the bearing-wheels and endless railway. Fig. 33 is a plan of the same. Fig. 34 is an end elevation of the harrow and of one of the brackets $n$, and so much of its attachments to the middle girders, $p$, as will give a clear view of one of the flexible seed-tubes $o^4$, conveying the seed down from the seed-box $o$, on top of the box-covering $l$, to the semi-circular tube $p^4$, showing one end two inches in the ground depositing the seed, the small scraper $q^4$, fast on the latter, drawing the harrowed soil and covering the drill formed by the end of the seed-tube $p^4$. When the locomotive-bridge arrives at the headland, the end of the tube $p^4$ is raised out of the ground and held there by the cross-pin $r^4$, when also the seed-box is thrown out of gear, and the grain ceases for the time being to fall down the flexible tube $o^4$. As soon as the return bout is taken, the opposite end of the tube $p^4$ is depressed and held to its work by reversing the position of the two cross-pins $r^4$ to what they were before for the last bout. I dispense with the semi-circular tube $p^4$ when using the self-adjusting apparatus, already described, and shown in Fig. 9, and lengthen the flexible tube $o^4$, and connect it to a short bit of tube with a similar scraper, $q^4$, which is alternately fastened to the ends of the balancing-beams $j^2$, to accomplish the same result of sowing the grain.

Fig. 21 is an end view of the reaping or mowing apparatus, referred to under the head of "Harvesting," and consists of a frame-work, $s^4$, of angle steel, made the full length of the section or span of growing grain, to be operated upon between the endless railway near each end of the bridge. It is furnished in suitable lengths with the proper number of ordinary reaping and mowing knives, with guard-points, &c. The frame $s^4$ is supported loosely at its upper side by hinges attached to the several transverse girders $q$, and the lower side is held up and suspended to near the ground by the inclined bars $t^4$. Each side of the locomotive-bridge is similarly furnished with the frame-work $s^4$, and also all the apparatus required to reap and mow, as set forth under the head of "Harvesting." The rear side frame-work, $s^4$, (seen broken off,) is raised high enough up to escape disturbing the reaped crop of grain after it has passed under the bridge and formed into a continuous swath, $x^4$, as shown in Fig. 37, and for the purposes set forth, as Plan No. 2 under the head of "Harvesting." $u^4$ are inclined shafts working at their upper ends in bearings, which are supported at each end on pivots loose in bearings fast on the bridge, in order to permit the shafts $u^4$ to be raised up on the return bout and throw themselves out of gear with the transverse shafts $v^4$. The lower ends of the several shafts $u^4$ are connected and drive the several reaping or mowing bars separately, so as to avoid any undue strain or friction on the knives or bars. The transverse shafts $v^4$ are carried in bearings fixed to the bridge, and are connected to the main shaft $k$ by means of the vertical shafts $w^4$ and the miter-gearing to complete the connection for actuating the reaping-bars and knives. $a^5$ is a series of holes in the bars $t^4$, for the purpose of sustaining the frame $s^4$ and the apparatus it carries when raised up or lowered down by means of movable bolts passed through eyes fast on the bridge at $b^5$. The bars $t^4$ not only sustain the weight of the frames $s^4$, but also act as guide-wings in forming the channels to conduct the falling reaped grain into a continuous swath, $x^4$, being narrowed and closed in at their tops, with their butt-ends broader and resting on the ground, the ears or heads of grain resting and all laid on top of the straw, shingled off, as it were, and in the best possible position for drying, and being protected from dirt, &c. The heads or tops of the straw or crop inclining toward and against the forward motion of the bridge, and against the feeding ends of the several thrashing-machines, are also in the very best position to be lifted up and onto the ends of the several slatted and revolving aprons $c^5$, led and carried into the thrashing-machines $r^3$, as seen in diagram lettered "Thrashing."

Fig. 24 is a sectional end elevation of the locomotive-bridge, showing the machinery or apparatus employed in carrying out Plan 3 under the head of "Harvesting." $s^4$ is the angle-steel frame, and $t^4$ are the inclined bars described in Fig. 21. $r^3$ are the thrashing-machines—two, three, or more, as found necessary—set in a line on the front edge of the flooring $m$ the required distances apart, as seen in diagram lettered "Thrashing." They are fastened to their seats by spring-latches, (not shown,) and pivoted on upright stud-pins near their centers, in order that when a section or span of crop has been reaped and thrashed, and the bridge has arrived at the headland, the thrashing-machines $r^3$ may be lifted up off their seats one after the other by the attendants, turned round end for end, and faced in the opposite direction to begin afresh and repeat the same work of thrashing required for the next section. $e^5$ is a round-belt pulley, fast on the main shaft $k$, driving the duplicated small pulleys $f^5$, fast on the shaft of the thrashing-drum $g^5$—one at each end. $h^5$ is a round belt connecting $e^5$ and $f^5$. $c^5$ are the slatted revolving aprons, mounted on rollers—one at each end, top and bottom—as shown, and made to travel or revolve around the rollers in the direction and up to the several thrashing-machines, carrying the grain to be thrashed in one continuous swath, $x^4$, with the tops or ears of the grain pointing to the mouths or feed-openings next the thrashing-drums $g^5$.
When thrashing, there is no necessity to raise up the back frame, $s^4$, as the straw is driven out and over the latter frame. The slatted aprons $c^5$, with the reaping apparatus, are both driven by the inclined shafts $u^4$ in a similar manner to that shown and described for Fig. 21.

In Fig. 24 are also shown the two angle-steel longitudinal stays $d^5$ $d^5$, which are bolted first to the channel-iron frames $v$, carrying the bearing-wheels and endless railway near each end of the locomotive-bridge, and, secondly, bolted to the several transverse brackets $n$ under the bridge, and for the full length of the section or span, as shown in elevation in Figs. 1, 13, and 32, and shown in cross-views in Figs. 9, 24, 25, and 34. These longitudinal stays maintain the lateral rigidity of the transverse brackets $n$, and they also help to maintain the vertical positions of the several spindles $d$. They are employed for all the purposes of the heavy and light work of cultivation, except when the crops are too high for the drill-husbandry system of cultivation. Then they are removed and bolted a little higher upon the brackets $n$ to escape damaging the tops of the grain or other plants, and permit the crops to have the full benefit of the height under the longitudinal girders of the locomotive-bridge. But for all the purposes of harvesting—such as mowing, reaping, thrashing, and carrying the crops to the headland—the machinery employed in working and seeding the land is then entirely removed—such as the stays, brackets, spindles, and implements, as well as the main shaft $k$ and miter-wheels $i$ and $j$—and a duplicate shaft, $k$, is substituted, with the requisite pulleys and gearing, to do the harvesting work, and permitting the locomotive-bridge to have a clear space under it to pass over the several crops to be operated upon without injuring them.

Figure 35:
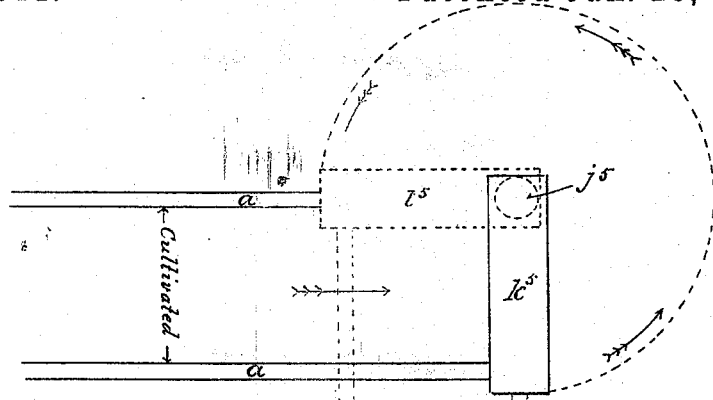

Fig. 35 is a diagram showing the manner of turning the locomotive-bridge round to assume a position on the side lands at right angles to the headlands for the object of cultivating transversely, and for the purposes already mentioned and described in a previous part of this specification under the seventh head. $j^5$ is the small turn table, placed on one of the paths $a$, and $k^5$ is the locomotive-bridge, one end of which is on the turn-table, scotched and thrown out of gear at the headland previous to its being driven round by the endless railway at the opposite end to that resting on the turn-table. $l^5$ is the locomotive-bridge after being driven round to take up the position shown on the side land, (dotted in and with the arrows indicating the line of motion,) prepared to do all the different classes of work already fully described. It will be readily observed that by means of these small turn-tables—one at each headland—turning the locomotive-bridge round to any point of a circle at the completion of a section or span of land, can be easily accomplished wherever the necessary space or room can be had outside the headland or boundary of the farm, thereby dispensing with the two headland tramways, if found necessary so to do; or the bridge can be turned round, as mentioned, within the boundary-line of the farm, if required, provided an unoccupied space at each end of the farm can be had, in order to avoid the driven end of the locomotive-bridge traveling over its own work.

Figure 36:
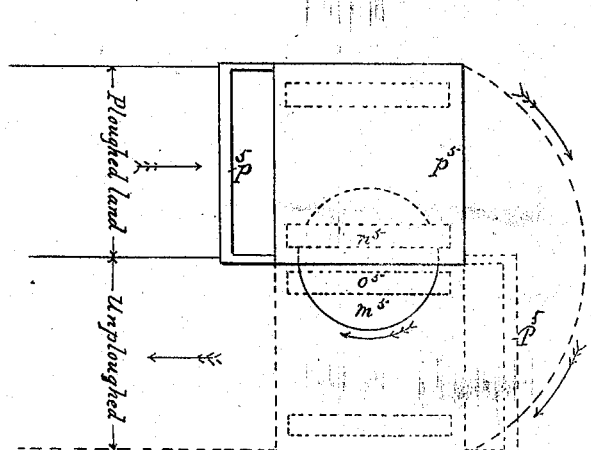

Fig. 36 is a diagram showing a traction-engine supposed to be supplied with my endless-belt track or railway—one set at each side—plowing or cultivating a breadth of land fourteen feet wide from outside to outside. $m^5$ is the turn-table, showing the rectangular frame $p^5$ to carry the plows or other implements mounted on the turn-table $m^5$ exactly in line with the central pivot of the table, while the outside line of the endless railway is removed exactly one foot distant from the central pivot of the turn-table $m^5$. It will be readily seen that as soon as that side of the traction-engine $n^5$ which is mounted on the turn-table $m^5$ is thrown out of gear, and the opposite end driven round a half-circle until it assumes the position shown at $o^5$ on the neighboring strip of land, (shown dotted in,) ready to begin afresh the same work performed on the last strip, both the plow-frame $p^5$ and endless railway are in their exact positions to take up and execute the work for the return bout or strip of land, the frame $p^5$ carrying the implements to cultivate one foot wider at each side than the outside of the endless railway, more minutely explained in the second paragraph under the seventh head.

I am aware that a cultivating apparatus has been provided with means for elevating one end from the ground and throwing the weight upon a swiveled wheel, by which arrangement the frame was enabled to be turned end for end, and this I do not claim. My transverse trucks are rigidly fixed against turning to any other position, and the entire frame is raised, the object being to secure a lateral movement bodily, and not a turning end for end.

All features herein shown and described but not specifically claimed are reserved as the subject-matter of separate applications.

Having thus described my invention, what I claim is—

1. The herein-described method or system of farm cultivation, which consists in dividing the land into sections of uniform width, with compacted dirt roads on both sides of each section, and carrying over such section a bridge or frame supported near its ends by road-locomotives traveling upon said roads, the frame or bridge being provided with implements to act upon the soil or crop over the entire width of the span or section.

2. The system or method of farm cultivation which consists in suspending the implements from a frame or bridge-like structure extending entirely across the section to be cultivated, and carried at its ends outside of said section upon road-locomotives, causing said structure to travel from end to end of the section, and then transferring it laterally to the adjoining section and repeating the operation.

3. A locomotive-bridge for carrying cultivating or farming implements, consisting of an elevated horizontal frame or structure supported at opposite ends by road-engines, substantially as shown, and for the purposes set forth.

4. In a locomotive bridge or structure for carrying or suspending farm machinery for use in the field, an elevated horizontal trussed platform carried near its ends upon traction-wheels and projecting beyond the latter at each end, and an engine mounted upon the projecting portion at each end, substantially as shown, whereby it is adapted to counterbalance the central portion of the structure.

5. In combination with an elevated frame or platform carried at its ends by traction-wheels, and driven by engines mounted upon said platform, a horizontal shaft extending from one side or end of the platform to the other, and provided at short intervals with wheels or gearing, whereby it is adapted to impart motion to independent implements of machinery at different points on the platform, as shown and described.

6. In a locomotive-bridge, substantially such as described, for use in farm cultivation, the combination of a platform, traction-wheels at opposite ends thereof supporting the same, engines mounted upon said platform, and friction-clutches connecting the separate engines, each with traction-wheels at the end of the platform on which the particular engine is mounted, and connected by rods with hand-levers at each end of the platform, whereby the steersman at either end of the said platform may retard either set of bearing-wheels by momentarily holding the clutch at that end out of action, as shown and described.

7. In combination with the platform-bridge $k^5$, traction-wheels $c\ c$, engines $t$, and boilers $u$, steam-pipe $i$, connecting the steam-chambers of the two boilers, whereby both engines are caused to act with like power, substantially as shown and described.

8. In combination with a locomotive-bridge arranged to do farm-work, traveling on compacted dirt roadways, substantially as shown and described, the small pilot-wheels $w'$, two on each side of said bridge, having projecting flanges or rims to travel and form indented channels upon and in the said compacted dirt roadways, for the purpose of indicating to the steersman the proper line of movement, substantially as described and shown.

9. The combination, with the locomotive-bridge herein described, of a reel having hooks $h^4$, and bolts, whereby it may be readily attached to or detached from the bridge, for the purpose explained.

10. A locomotive-bridge for farm cultivation, provided with main carrying-wheels, and supplemental carrying-wheels permanently set at right angles to the first, and means, substantially such as described and shown, whereby the weight of the bridge may be thrown entirely upon the transverse wheels, and the main wheels raised from the ground to permit the lateral movement of the bridge from one section to the other, as shown and described.

11. In a locomotive bridge or frame, substantially such as shown and described, the combination of the main carrying-wheels and secondary wheels, and pressure-cylinders adapted to guide the spindles of the secondary wheels and to receive the fluid by which the said bridge is raised upon said spindles, as shown and described.

12. In combination with a locomotive-bridge substantially such as described, adjustable frame-works $s^4$, one attached to each side of the locomotive bridge, and each provided with independent shafts $u^4$, adapted to be raised and lowered, as explained, and for the purpose set forth.

13. In combination with a locomotive-bridge substantially such as shown and described, a series of self-adjusting vertical spindles armed with tools or implements at their lower ends to operate in or upon the soil or crops over which the bridge passes.

ROBERT ROMAINE.

Witnesses:
WILLIAM W. DODGE,
WALTER S. DODGE.